US012789506B2

(12) United States Patent
Cerny et al.

(10) Patent No.: US 12,789,506 B2
(45) Date of Patent: Nov. 10, 2026

(54) FILM PRODUCT FOR APPLICATION TO A BUILDING SHELL FOR PROTECTION AGAINST BIRD IMPACT

(71) Applicant: BIRDSHADES INNOVATIONS GMBH, Leoben (AT)

(72) Inventors: Christoph Cerny, Graz (AT); Dominique Waddoup, Graz (AT)

(73) Assignee: BIRDSHADES INNOVATIONS GMBH, Leoben (AT)

( * ) Notice: Subject to any disclaimer, the term of this patent is extended or adjusted under 35 U.S.C. 154(b) by 210 days.

(21) Appl. No.: 18/694,397

(22) PCT Filed: Sep. 22, 2022

(86) PCT No.: PCT/AT2022/060312
§ 371 (c)(1),
(2) Date: Mar. 21, 2024

(87) PCT Pub. No.: WO2023/044517
PCT Pub. Date: Mar. 30, 2023

(65) Prior Publication Data

US 2024/0393512 A1 Nov. 28, 2024

(30) Foreign Application Priority Data

Sep. 22, 2021 (AT) ................................. A 158/2021

(51) Int. Cl.
*B32B 17/06* (2006.01)
*B32B 17/10* (2006.01)

(52) U.S. Cl.
CPC ........ *B32B 17/06* (2013.01); *B32B 17/10174* (2013.01)

(58) Field of Classification Search
CPC ...... B32B 17/06; B32B 17/10174; E06B 9/24
USPC ......................................................... 428/201
See application file for complete search history.

(56) References Cited

U.S. PATENT DOCUMENTS

2009/0047487 A1* 2/2009 Klem, Jr. ............. A01M 29/06
428/210
2012/0113519 A1 5/2012 Klem
2014/0168760 A1* 6/2014 Theios ............... C03C 17/3681
359/359

(Continued)

FOREIGN PATENT DOCUMENTS

WO WO 2015/181542 A1 12/2015
WO WO 2020/225256 A1 11/2020

OTHER PUBLICATIONS

International Search Report and Written Opinion of International Searching Authority for Patent Application No. PCT/AT2022/060312, dated Dec. 20, 2022, with English translations (19 pages).

*Primary Examiner* — Betelhem Shewareged
(74) *Attorney, Agent, or Firm* — Nixon Peabody LLP

(57) ABSTRACT

A film product for application to a building envelope, in particular a transparent partial section of the building envelope, for protection against bird strikes, includes a film body with a planar extension. The film body has at least one planar primary section with an optical primary function and at least one planar secondary section with an optical secondary function. The optical primary function and the optical secondary function both have an optical effect in the UV-A range and differ from each other in order to create a contrasting effect in the UV-A range.

14 Claims, 9 Drawing Sheets

(56) References Cited

U.S. PATENT DOCUMENTS

| | | | | |
|---|---|---|---|---|
| 2015/0050505 | A1* | 2/2015 | Arkles | C03C 17/34<br>427/160 |
| 2016/0041319 | A1 | 2/2016 | Hicks | |
| 2020/0281188 | A1* | 9/2020 | Donoho | A01M 29/32 |
| 2024/0393512 | A1* | 11/2024 | Cerny | A01M 29/08 |

* cited by examiner

FILM PRODUCT FOR APPLICATION TO A BUILDING SHELL FOR PROTECTION AGAINST BIRD IMPACT

CROSS-REFERENCE TO RELATED APPLICATIONS

This application is a U.S. National Stage of International Application No. PCT/AT2022/060312, filed Sep. 22, 2022, which claims the benefit of and priority to Austrian Patent Application No. A 158/2021, filed Sep. 22, 2021, each of which is hereby incorporated by reference herein in its entirety.

FIELD

The present invention relates to a film product for application to a building envelope for protection against bird strike, a façade element comprising such a film product and a manufacturing process for such a film product.

BACKGROUND

It is known that, among other things, façade elements which are transparent or reflective are incorporated in building envelopes. Transparent partial sections of such façades, for example large glass surfaces or window modules, lead to so-called bird strikes. This means that a bird does not perceive these glass elements as an obstacle, but flies into these and in this way is either seriously injured or even killed.

In order to avoid or at least reduce such bird strikes, it has for example previously been known for visible patterns to be applied to the windows. However, this is often undesirable from an optical point of view, and also obscures the view through these glass elements. However, these known solutions depend to a great extent, in terms of their effect, on the chosen pattern. If, for example, the patterns are too fine, the bird can no longer perceive this pattern as an obstacle. Also, different bird species have different qualities of perception, so that the selection of an optical functionality does not function equally well for different bird species.

SUMMARY

It is the object of the present invention to remedy, at least in part, the disadvantages described above. In particular, it is the object of the present invention to be able to provide the broadest possible efficacy against bird strike on building envelopes in a cost-effective and simple manner, preferably with little or no influence on the aesthetics of these structures for the human eye.

The above object is achieved by a film product with the features of claim 1, a façade element with the features of claim 13 and a manufacturing process with the features of claim 14. Further features and details of the invention are disclosed in the dependent claims, the description and the drawings. Naturally, features and details described in connection with the film product according to the invention also apply in connection with the façade element according to the invention as well as the manufacturing process according to the invention and vice versa, so that, with regard to disclosure, mutual reference is or can always be made to the individual aspects of the invention.

The core idea of the present invention is to avoid a bird strike on a building envelope. For this purpose, a film product is proposed for application to a building envelope, in particular a transparent partial section of this building envelope, for protection against bird strike. This film product has a film body with a planar extension. This film body is equipped with at least one planar primary section with an optical primary function and at least one planar secondary section with an optical secondary function. Furthermore, the optical primary function and the optical secondary function are equipped with an optical effect in the UV-A range, whereby these optical effects differ from each other, between primary function and secondary function, in order to provide a contrasting effect in the UV-A range.

In the context of the present invention, building envelopes are to be understood as all building structures or parts of building structures which are exposed to the risk of bird strike. In addition to windows and mirrored surfaces, these also include balcony elements, noise barriers, privacy screens or the like.

As will be explained later, the film body can be of single-part or multi-part design. Thus, in addition to a single-part film body, a division into several parts spaced apart from each other which are arranged at a distance from each other, for example on a main façade body, is also conceivable.

The core idea according to the invention is based on the fact that birds have a perceptual ability in the UV-A range which humans do not have, i.e. in a wavelength range that is invisible to the human eye. This makes it possible to equip the primary section and the secondary section with the primary function and the secondary function as an optical effect in the UV-A range, so that the primary sections and the secondary sections can be perceived by birds and are not visible to humans. Thus, the film product appears transparent to a human, while a bird perceives the primary section and the secondary section.

The core idea according to the invention has been developed further to the effect that, while the primary section and secondary section are both in the UV-A range in terms of their optical effect, this optical effect differs in each case. This different optical effect in the UV-A range leads to a contrasting effect between primary section and secondary section which also preferably lies exclusively within the UV-A range. In other words, it is now possible to create a contrasting image which is only perceptible to birds and not to humans. This means that, rather than a single pattern visible to the bird being provided next to a transparent or reflective background which it cannot perceive, a contrasting image between two different sections recognisable by the bird, namely the primary section and the secondary section, is provided. It can already be seen here that further additional sections, for example a tertiary section or a quaternary section with corresponding tertiary functions and quaternary functions, can of course also be used. It should also be pointed out that the optical effect in the UV-A range can also be reduced to a minimum in order to achieve contrast. For example, the primary section can have a reflective primary function, while the secondary section is designed to be transparent or substantially transparent for the UV-A range.

A major advantage of the present invention is that the different sections in the form of the primary section and secondary section have a different optical effect in the UV-A range. This means, for example, that a different absorption and/or reflection takes place at different wavelengths in the UV-A range, in particular compared to the material of the partial section of the building envelope, for example glass or Perspex. The aim of this is to create a contrast situation perceptible to birds. In particular when different bird species have a different range of perception, these contrasts can lead to improved perceptibility in different bird species. If, in an extreme case, one bird species does not perceive one of the two sections, for example the primary section, at all, but only the secondary section, in this case the film product still acts at least partially to avert bird strike through the perception of the secondary section. If another bird species is not able to perceive the secondary section, the same protective effect is provided for this bird species due to the perceptibility of the primary section. In most cases however, the bird species will be able to recognise both sections with varying quality and, due to the contrasting effect, will also perceive these as an obstacle.

In addition to the broad effectiveness for different bird species, the design according to the invention also broadens the effectiveness for different lighting situations. For example, the protective function of a film product according to the invention is also provided for different angles of incidence of sunlight at different times of the year and/or at different times of day.

In addition to broadening the efficacy, also for different perceptual situations in different bird species, the design according to the invention also means that, in principle, the design of the pattern for the primary section and the secondary section is irrelevant. Of course, an enhanced protective effect can be achieved through a defined selection of stripes, dots or raster elements. However, due to the contrasting effect between the primary section and secondary section in the UV-A range, a protective effect against bird strike can be achieved regardless of the actual pattern situation.

On the basis of the above explanation, it can be seen that the protection against bird strike can be significantly increased by a film product according to the invention. This means that a partial section of the building envelope which is provided with a film product is much less likely to be perceived by birds as a possible flight path, but rather as a barrier, so that the bird in question will direct its flight path past this film product. A film product according to the invention therefore provides greater and more broadly effective protection for birds of different sizes and also for different perceptual situations in different bird species. The geometrical extension of the at least one primary section and the at least one secondary section can be adapted here to different bird species, in particular different sized bird species.

It can be advantageous if, in a film product according to the invention, the optical effect of the optical primary function and the optical secondary function is selected from the following optical effects:

UV-A absorption,

UV-A reflection.

The above list is non-exhaustive. Of course, the optical effects can also correlate with each other, i.e. increased UV-A absorption can lead to reduced UV-A reflection. It is possible that different optical effects are combined between primary function and secondary function. However, it is also possible that two, or in particular all sections have an identical or substantially identical optical effect. UV-A absorption is to be understood as an optical effect which will absorb irradiated sunlight to a certain extent.

As a result, in this UV-A range perceptible to the bird, this section with higher UV-A absorption and/or reduced UV-A reflection appears darker. Similarly, UV-A reflection can lead to increased reflection when sunlight in the UV-A range is irradiated. For such a section with increased UV-A reflection, the bird thus perceives this as increased brightness. Here it is easy to see how, by increasing or decreasing the brightness of the individual sections on the film product, this film product can become recognisable to the bird as a barrier through the contrasting effect between the different sections. It is also easy to see here that a normal window pane, which allows sunlight to pass through completely, or substantially completely, also in the UV-A range, is not recognisable to the bird as a barrier, and therefore the risk of bird strikes already explained above exists.

It also brings advantages if, in a film product according to the invention, the optical primary function and the optical secondary function have the same optical effect with different quantitative effects. For example, all functions of a film product can exhibit UV-A absorption or UV-A reflection. Thus, it is possible that there is a different quantitative degree of absorption. As explained in the previous paragraph, this leads to areas of different darkness, in the bird's perception, between the primary section and the secondary section. If there is a different degree of reflectance, this leads to different levels of reflection and thus to areas of different brightness, in the bird's perception, between the primary section and the secondary section. Here it becomes apparent once again how easily the protective effect can be achieved, with nevertheless very high effectiveness in the perception of the birds.

It may be advantageous if, in a film product as described in the preceding paragraph, the optical primary function differs from the optical secondary function in respect of at least one of the following optical function parameters:

optical function curve as a function of wavelength, in particular an absorption curve or reflection curve, quantitative functional effect, in particular degree of absorption or reflectance.

The above list is also non-exhaustive. A quantitative distinction is also to be understood as a complete comparison of the function curve, for example a kink or a shift in a function curve at different wavelengths. In addition, or alternatively, different degrees of absorption can allow the desired distinction. Of course, a combination is also possible. It is preferable if the quantitative distinction is at least 2%, in particular 5% or more, in relation to a maximum absorption and/or reflection in order to achieve a sufficiently strong contrast.

It is also advantageous, if, in a film product according to the invention, the primary section has a different material composition than the secondary section. This can be understood to mean that the primary section and secondary section have completely different materials. However, it is also possible to use the same or similar materials, but in different partial concentrations. For example, identical materials, but with different thicknesses, are also conceivable. Identical materials with different material additives are also possible in order to create a distinction in the optical effect.

It is also advantageous if, in a film product according to the invention, the film body has at least one transparent section. Such a transparent section can for example be adjacent to the primary section and/or the secondary section and can thus preferably be integrated into a pattern of the film product, which will be explained later. The transparent section is preferably large enough in terms of geometrical extension to complement the contrasting effect of the present invention and at the same time small enough not to be perceived by birds as a gap which can be flown through. The transparent section also allows an additional contrast to the adjacent primary sections and secondary sections to be provided. It should also be pointed out that, in the simplest case, the transparent section is formed by a lack of material between the primary section and the secondary section, so that only the glass pane or Perspex panel underneath influences the incident sunlight. However, a transparent filling material for such a transparent section is also conceivable. Of course, in addition to glass and Perspex, other materials are also conceivable as carrier materials within the context of the present invention.

It is also advantageous if, in a film product according to the invention, the primary section and the secondary section have a transmittance of more than approx. 80% for visible light. Visible light is to be understood here as the wavelength range which can be perceived by the human eye. In other words, the primary section and the secondary section are inactive or substantially inactive in the range visible to the human eye. A transmittance independent of the UV-A range means that a high transmittance leads to a high level of brightness within the room for people inside the building. In particular, this exhibits a regular progression, so that the user does not perceive any shading or gradient within the film product. It is particularly preferable if the primary section and secondary section have a similar, preferably an identical or substantially identical transmittance for visible light, so that no formation of patterns or stripes on the film product is visible to humans within the building due to differing transmittance when light passes through.

It also brings advantages if, in a film product according to the invention, the primary section and the secondary section are at least partially directly adjacent to each other. While a spaced arrangement of the primary section and secondary section is also possible when using the transparent sections explained above, an arrangement of the primary section and secondary section preferably at least partially directly adjacent to each other is advantageous in order to achieve an ideal contrast effect. The primary section and secondary section can be arranged in relation to each other in the film product in a regular manner and can, for example, form a repeat arrangement or a repeat pattern.

It is also advantageous if, in a film product according to the invention, the surface areas of the primary section and the secondary section depend on the strength of the contrasting effect. The contrasting effect, in turn, depends on the difference in the visual effect. Particularly in the case of a quantitative distinction, for example with different reflection rates, an increased contrast is achieved in that the reflection rates differ greatly from each other. Thus, the greater the possibility of distinguishing between primary section and secondary section, the stronger the contrasting effect in the perception of the bird. Also, the stronger the contrasting effect, the larger the individual surfaces can be in relation to each other, as they can be perceived by the bird as an obstacle. However, in the case of very strong reflection, the provision of very small areas should in particularly be avoided, as otherwise the risk of lateral dazzle in the bird's perception would increase, i.e. the bird would no longer perceive the contrasting smaller areas next to the highly reflective surface and the effect according to the invention would thus be weakened.

It is also advantageous if, in a film product according to the invention, the at least one primary section and the at least one secondary section are arranged in a pattern in the film body. This can be a regular pattern, a partially regular pattern and/or an irregular pattern. In particular, this is a repeat pattern. For example, dot patterns, line patterns, grid patterns or the like are conceivable within the scope of the present invention.

It can also be advantageous if, in a film product according to the invention, the main film body has a base layer on which the primary section and/or the secondary section is applied as a functional layer. This can be provided, as explained later with reference to the manufacturing process, by co-extrusion, by adhesive bonding or by printing or painting. A layer-by-layer structure of the main film body with base layer and functional layer allows for particularly simple and cost-effective production and also for particularly simple and cost-effective application to the corresponding façade element. In particular, the base layer can also have an appropriate adhesive layer for application and fastening to the façade element. In addition to the multi-layer design described above, a single-layer design is also conceivable, i.e. exclusively with a functional layer, without a base layer. Such a variant can for example be produced in an extrusion process.

It also brings advantages if, in a film product according to the invention, a filling layer is arranged on the base layer between the primary section and the secondary section. In particular, this filling layer forms an additional filling in the area of the transparent section, so that differences in thickness between areas without a functional layer and areas with a functional layer can be compensated. In addition to improved manufacture, this means that the formation of optical lines at different viewing angles due to otherwise existing differences in thickness can be avoided.

The subject matter of the present invention also includes a façade element for a partial section of a building envelope, in particular in the form of a window or a glass element. Such a façade element has a main façade body with a film product according to the present invention. Thus, such a façade element brings with it the same advantages as have been explained in detail with reference to a film product according to the invention. The film product can be applied to the outside and/or inside of such a façade element, for example a window. However, in a multi-layered window it can also be embedded between the individual layers of the glass panes. It is also possible to coat the façade element with the finished film subsequently. Last but not least, the finished window can also be coated by direct formation of the film product in the form of painting or other coating processes, and/or applied to the main façade body during the production process of same.

A film product according to the present invention can be formed in a wide variety of ways. For example, this can be understood as a film which can be rolled up in roll form for application to a façade element. It is also conceivable for the film product to be in the form of a coating of the façade element by means of a coating process, printing process, painting process or the like, so that the film product can be formed as an anti-bird strike protective layer on and/or within the façade element. It should also be pointed out that the film product can be of a planar and one-piece design. However, particularly in the case of the aforementioned coating processes, a multi-part design is also possible, so that, for example, the at least one primary section can be distanced from the at least one secondary section and arranged separately from this on the façade element. In such an embodiment, the film body comprises several partial bodies which in particular do not need to be connected to each other.

The application onto, on or between individual layers in the façade element can be carried out during the production of the façade base body, i.e. for example in the production of a glass pane or a Perspex panel. In addition, or alternatively, a subsequent application is also conceivable, so to speak as a finishing of the glass pane and/or the Perspex panel. In particular, production of the film product by extrusion, in particular together with the Perspex panel, is also possible within the context of the present invention.

Organic, inorganic or a mixture of organic and inorganic materials can for example be used as materials for the film product. Also, the film body can consist of a single layer, in particular exclusively of a functional layer, or it can be multi-layered, for example with a base layer.

In addition, the subject matter of the present invention includes a manufacturing process for the manufacture of a film product according to the present invention, comprising the following steps:

Forming a film body with at least one functional layer comprising the at least one primary section and the at least one secondary section.

Thus, a manufacturing process according to the invention brings with it the same advantages as have been explained in detail with reference to a film product according to the invention. The formation of the layers can be achieved by extrusion processes, adhesive bonding processes, coating processes, painting processes, printing processes, sol-gel processes or the like.

BRIEF DESCRIPTION OF THE DRAWINGS

Further advantages, features and details of the invention are explained in the following description, in which embodiments of the invention are described in detail with reference to the drawings. The features mentioned in the claims and in the description may in each case be essential to the invention individually or in any combination. In each case schematically:

DETAILED DESCRIPTION

Figure 1:
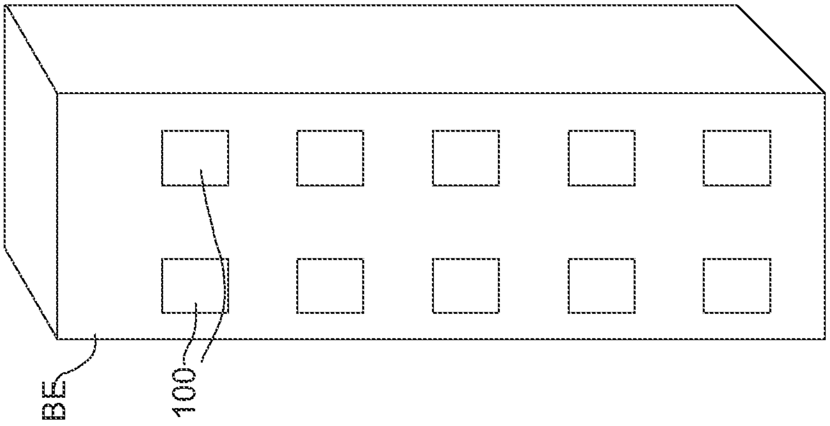
FIG. 1 shows an embodiment of a building envelope with façade elements according to the invention.

In FIG. 1, a building is represented schematically as a building envelope BE, with numerous windows as façade elements 100. These are to be protected against bird strikes and are therefore designed in particular as shown in FIG. 2.

Figure 2:
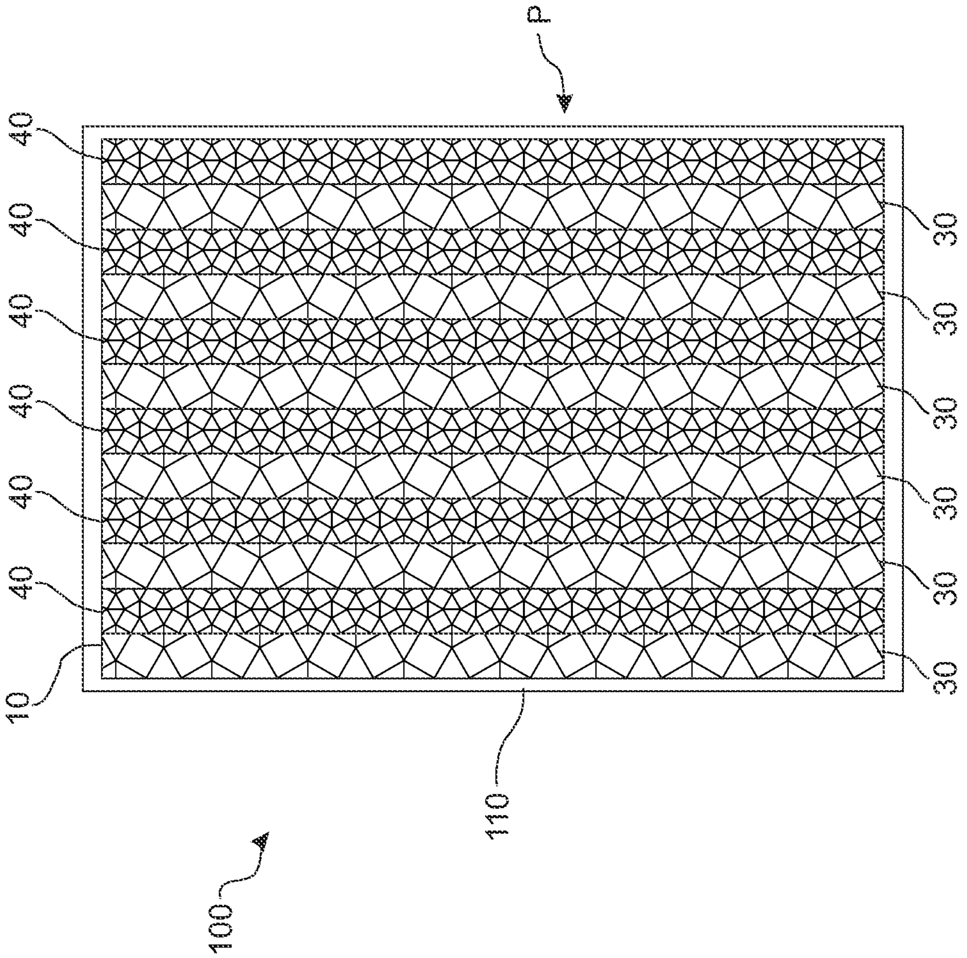
FIG. 2 shows a façade element according to the invention in detail.

FIG. 2 shows a top view of a window as a façade element 100. This window has a main façade body 110 in the form of a window pane or pane of glass. FIG. 2 shows a situation from the bird's point of view, i.e. a possibility of perception in the UV-A range. Because FIG. 2 shows a representation in the UV-A range, the different contrasting effects between primary sections 30 and secondary sections 40 can also be recognised. This is illustrated in more detail here by different hatchings. In this embodiment, a plurality of primary sections 30 and secondary sections 40 are incorporated in a striped pattern P relative to each other as a repeat. Thus, a linear pattern is formed which, however, can only be perceived in a contrasting effect in the UV-A range by birds, and therefore not by humans. For the bird, the film product 10 thus forms a barrier due to a perception as for example formed in FIG. 2 with different degrees of brightness and/or areas of different degrees of darkness.

Figure 3:
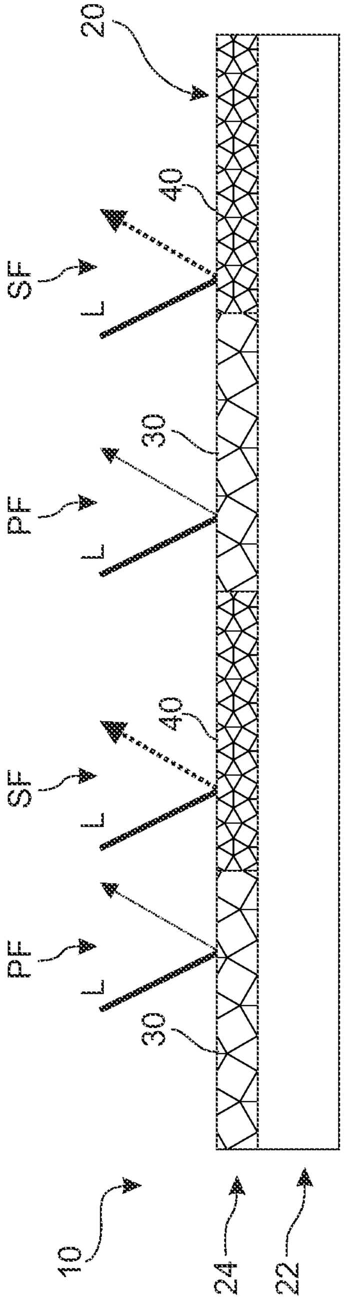
FIG. 3 shows a schematic cross-section through a film product according to the invention.
Figure 9:
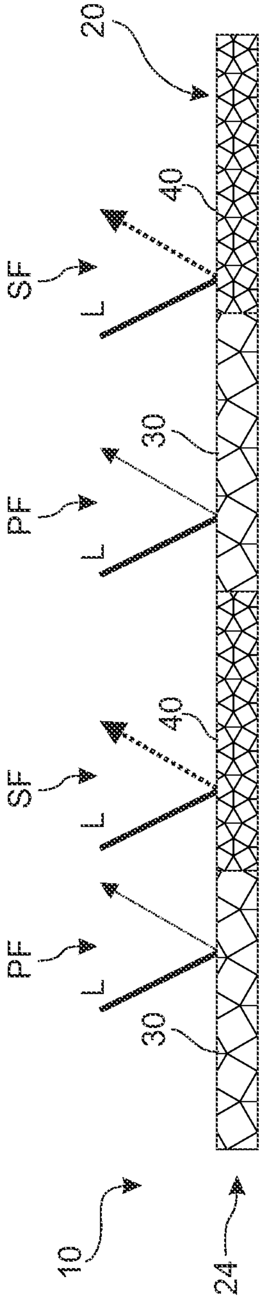
FIG. 9 shows a schematic cross-section through a film product according to the invention.

FIG. 3 shows a cross-section through a possible film product 10. Here, the film body 20 is structured in two layers. The base layer 22 is designed as a carrier layer, while the functional layer 24 above has the individual primary sections 30 and secondary sections 40. These too are again formed in the form of stripes. Here, the primary function PF and the secondary function SF are assigned schematically to the individual sections 30 and 40. It can be seen from the different thicknesses of the reflective arrows for the light path L that the primary section 30 has an optical primary function PF with low reflection and the secondary section 40 has an optical effect, as secondary effect SF, with different, for example, stronger reflection. This leads to stripes of different brightness being perceived by the bird. FIG. 9 shows a similar embodiment to FIG. 3, but no base layer is provided. In this variant, the main film body 20 is formed exclusively by the functional layer 24. Such a variant can for example be manufactured by extrusion.

Figure 4:
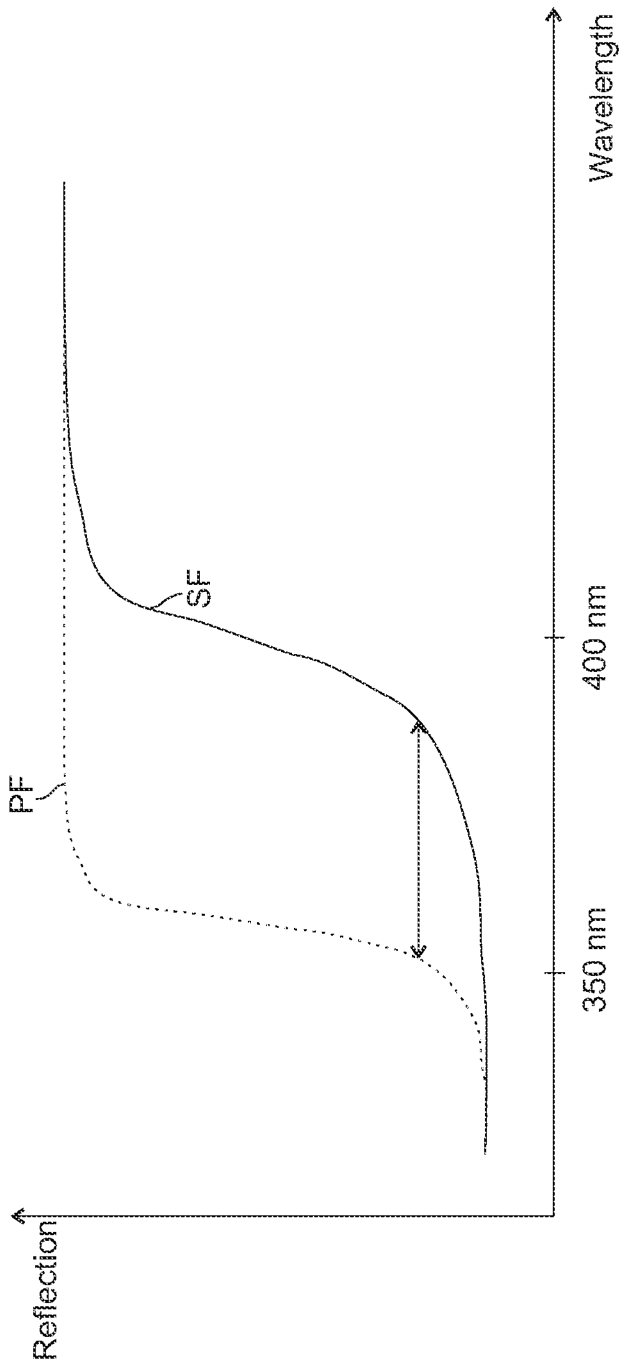
FIG. 4 shows a possibility for different optical effects.
Figure 5:
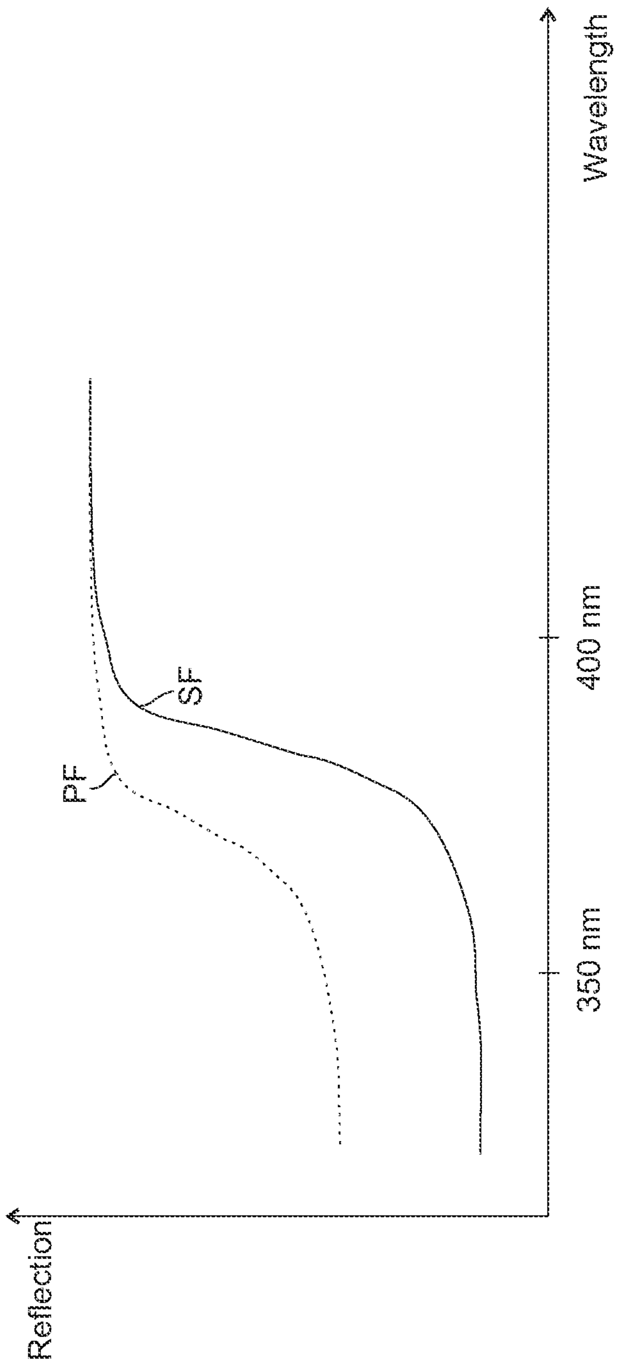
FIG. 5 shows a further possibility for different optical effects.
Figure 7:
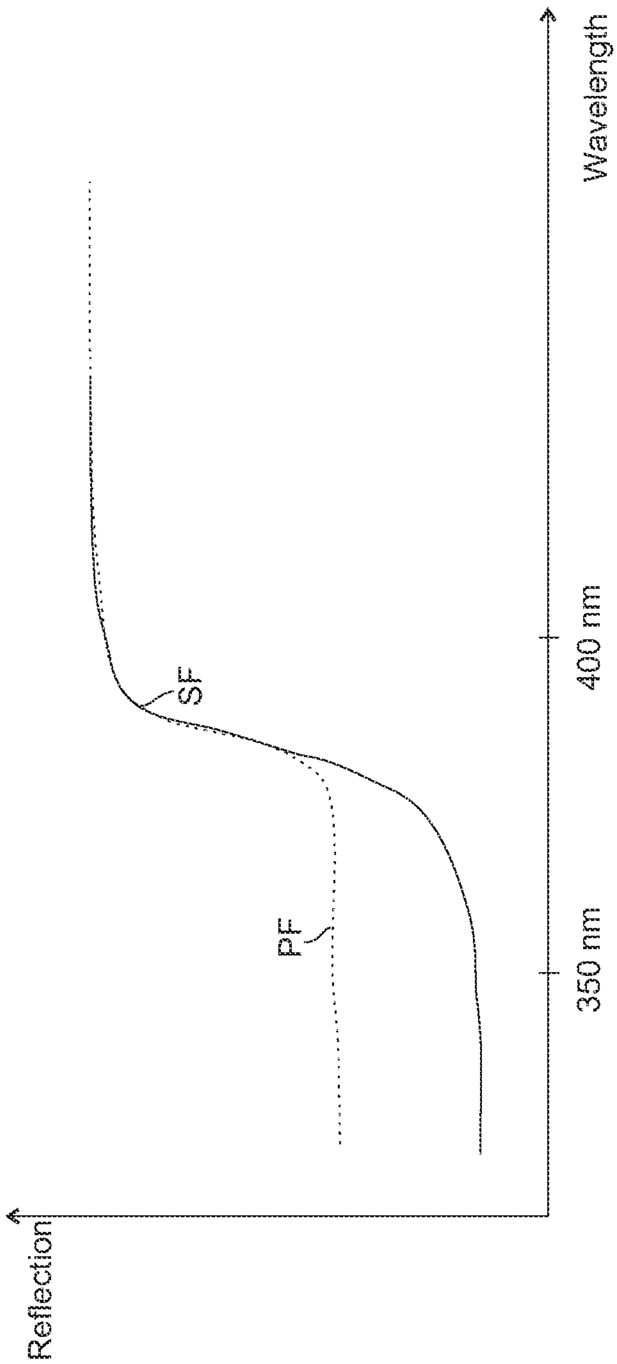
FIG. 7 shows a further possibility for different optical effects.
Figure 8:
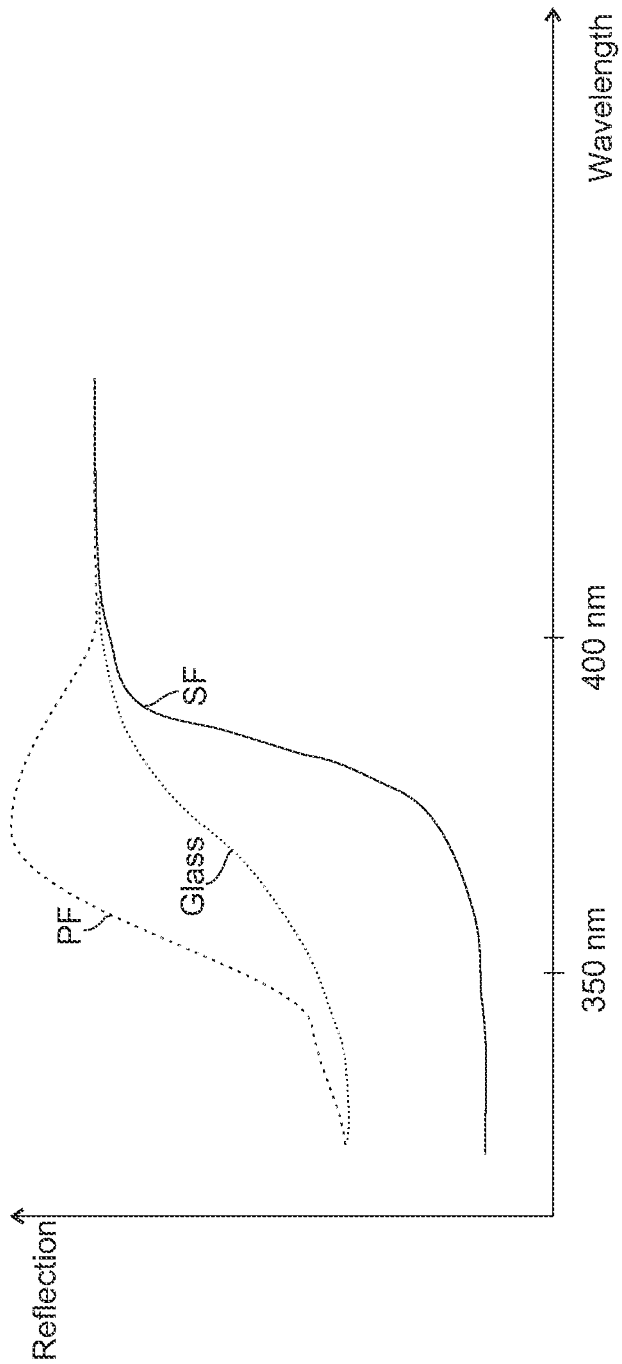
FIG. 8 shows a further possibility for different optical effects.

FIGS. 4 and 5 show different possible effects for differentiating between the primary function and secondary function. FIG. 4 shows different function curves with regard to reflection. The primary function PF already increases or reduces reflection at a lower wavelength than is the case for the secondary function SF. This leads to the described contrasting effect in the perception of the bird. Alternatively or additionally, an amplitude-based differentiation between the primary function PF and secondary function SF as shown in FIG. 5 is also possible, i.e. with different curves. Of course, these two variations can also be combined according to FIGS. 4 and 5 to achieve an even stronger contrast in the effect perceived by the bird. FIGS. 7 and 8 also show further possible curves which lead to different optical effects. FIG. 8 shows that the primary function can be reflective or absorbent, compared to the base layer, which is for example made of glass.

Figure 6:
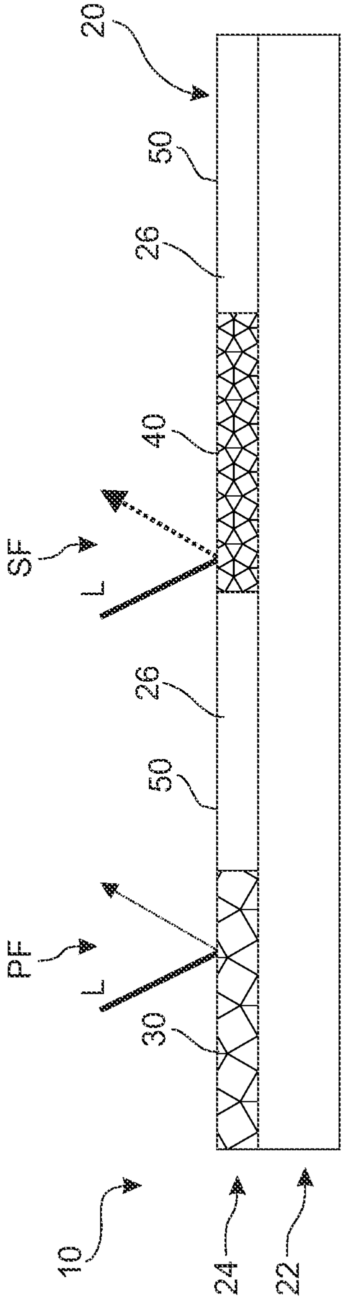
FIG. 6 shows a further embodiment of a film product.

FIG. 6 shows a further development of FIG. 3. Here, a transparent section 50 is also integrated between the primary section 30 and the secondary section 40, which has been formed here by a filling layer 26. This makes it possible to combine a contrast effect with transparent sections 50, so that the transparent section 50 contributes to the contrasting effect, so to speak.

The above explanation describes the present invention exclusively in the context of examples. Naturally, individual features of the embodiments can be combined freely with each other, where technically expedient, without departing from the scope of the present invention.

LIST OF REFERENCE SIGNS

10 film product
20 film body
22 base layer
24 functional layer
26 filling layer
30 primary section
40 secondary section
50 transparent section
100 façade element
110 main façade body
BE building envelope
P pattern
PF primary function SF secondary function
L light

The invention claimed is:

1. A film product for application to a building envelope for protection against bird strikes, the film product comprising:
- a film body with a planar extension, the film body having (i) a planar primary section with an optical primary function and (ii) a planar secondary section with an optical secondary function,
- wherein the optical primary function and the optical secondary function both have an optical effect in the UV-A range and differ from each other to aid in creating a contrasting effect in the UV-A range, and
- wherein the optical primary function and the optical secondary function have (1) a similar UV-A absorption optical effect with different quantitative degrees of absorption, or (2) a similar UV-A reflection optical effect with different quantitative degrees of reflection.

2. The film product of claim 1, wherein the optical effect of the optical primary function and the optical secondary function is a UV-A absorption optical effect or a UV-A reflection optical effect.

3. The film product of claim 1, wherein the optical primary function differs from the optical secondary function in respect of a quantitative functional effect, and, optionally an optical function curve as a function of wavelength.

4. The film product of claim 1, wherein the planar primary section has a different material composition than the planar secondary section.

5. The film product of claim 1, wherein the film body has at least one transparent section.

6. The film product of claim 1, wherein the planar primary section and the planar secondary section have a transmittance of more than about 80 percent of visible light.

7. The film product of claim 1, wherein the planar primary section and the planar secondary section are at least partially directly adjacent to each other.

8. The film product of claim 1, wherein the surface areas of the planar primary section and the planar secondary section depend on the strength of the contrasting effect.

9. The film product of claim 1, wherein the planar primary section and the planar secondary section are arranged in a pattern in the film body.

10. The film product of claim 1, wherein the film body has a base layer on which the planar primary section and/or the planar secondary section is applied as a functional layer.

11. The film product of claim 10, further comprising a filling layer is arranged on the base layer between the planar primary section and the planar secondary section.

12. A façade element for a partial section of a building envelope comprising:
- a main façade body including a film product having:
  - a film body with a planar extension, the film body having (i) a planar primary section with an optical primary function and (ii) a planar secondary section with an optical secondary function,
  - wherein the optical primary function and the optical secondary function both have an optical effect in the UV-A range and differ from each other to aid in creating a contrasting effect in the UV-A range, and
  - wherein the optical primary function and the optical secondary function have (1) a similar UV-A absorption optical effect with different quantitative degrees of absorption, or (2) a similar UV-A reflection optical effect with different quantitative degrees of reflection.

13. A method of manufacturing a film product, the method comprising:
- forming a film body with a functional layer having a planar primary section and a planar secondary section, the planar primary section having an optical primary function and the planar secondary section having an optical secondary function,
- wherein the optical primary function and the optical secondary function both have an optical effect in the UV-A range and differ from each other to aid in creating a contrasting effect in the UV-A range, and
- wherein the optical primary function and the optical secondary function have (1) a similar UV-A absorption optical effect with different quantitative degrees of absorption, or (2) a similar UV-A reflection optical effect with different quantitative degrees of reflection.

14. The film product according to claim 2, wherein the optical primary function differs from the optical secondary function in respect of a degree of absorption or reflectance, and, optionally, an absorption curve or reflection curve.

* * * * *